(12) United States Patent
Gray, Jr. et al.

(10) Patent No.: US 8,985,089 B2
(45) Date of Patent: Mar. 24, 2015

(54) LOW TEMPERATURE DUAL FUEL COMBUSTION UTILIZING DIESEL AND METHANOL FUELS

(75) Inventors: Charles L. Gray, Jr., Pinckney, MI (US); Matthew J. Brusstar, South Lyon, MI (US); Michael Prince, South Lyon, MI (US)

(73) Assignee: The United States of America, as represented by the Administrator of the U.S. Environmental Protection Agency, Washington, DC (US)

( * ) Notice: Subject to any disclaimer, the term of this patent is extended or adjusted under 35 U.S.C. 154(b) by 237 days.

(21) Appl. No.: 13/557,512

(22) Filed: Jul. 25, 2012

(65) Prior Publication Data

US 2014/0026853 A1 Jan. 30, 2014

(51) Int. Cl.
| | | |
|---|---|---|
| *F02D 19/08* | (2006.01) | |
| *F02D 19/06* | (2006.01) | |
| *F02B 7/02* | (2006.01) | |
| *F02D 41/00* | (2006.01) | |

(52) U.S. Cl.
CPC ............... *F02D 19/0655* (2013.01); *F02B 7/02* (2013.01); *F02D 19/081* (2013.01); *F02D 19/0689* (2013.01); *F02D 19/0692* (2013.01); *F02D 41/0025* (2013.01); *Y02T 10/36* (2013.01)
USPC .............. 123/575; 123/299; 123/1 A; 123/577

(58) Field of Classification Search
CPC ............ F02D 41/3094; F02D 41/0025; F02D 41/0027; F02D 41/003; F02D 41/102; F02D 41/105; F02D 19/0689; F02D 19/0692; F02D 19/0655
USPC ...... 123/431, 299, 25 A, 25 E, 698, 1 A, 575, 123/576, 577, 578, 308; 60/278, 280, 285
See application file for complete search history.

(56) References Cited

U.S. PATENT DOCUMENTS

| | | | | |
|---|---|---|---|---|
| 4,553,504 | A * | 11/1985 | Duggal et al. ............... | 123/25 J |
| 4,958,598 | A * | 9/1990 | Fosseen ........................ | 123/1 A |
| 5,826,558 | A * | 10/1998 | Kawamura .................... | 123/292 |
| 6,857,263 | B2 * | 2/2005 | Gray et al. ...................... | 60/278 |
| 7,225,763 | B2 * | 6/2007 | Ritter et al. ............... | 123/27 GE |
| 7,387,091 | B2 * | 6/2008 | Ritter ........................ | 123/27 GE |
| 7,428,810 | B2 * | 9/2008 | Driscoll .......................... | 60/286 |
| 7,712,451 | B2 * | 5/2010 | Hung et al. .................. | 123/431 |
| 7,805,238 | B2 * | 9/2010 | Andri ............................ | 701/104 |
| 7,913,673 | B2 * | 3/2011 | Vanderslice et al. .......... | 123/525 |
| 2001/0022168 | A1 * | 9/2001 | Teraji et al. ................... | 123/295 |
| 2003/0077210 | A1 * | 4/2003 | Nau et al. ..................... | 422/194 |
| 2004/0055282 | A1 * | 3/2004 | Gray et al. ...................... | 60/278 |
| 2007/0039598 | A1 * | 2/2007 | Wakayama et al. ...... | 123/568.21 |
| 2007/0079798 | A1 * | 4/2007 | Siewert ........................ | 123/299 |
| 2007/0119422 | A1 * | 5/2007 | Lewis et al. .................. | 123/431 |
| 2007/0131180 | A1 * | 6/2007 | Roehm ........................ | 123/25 A |
| 2008/0072872 | A1 * | 3/2008 | Siewert ........................ | 123/299 |
| 2009/0151692 | A1 * | 6/2009 | He et al. ........................ | 123/299 |

(Continued)

*Primary Examiner* — Lindsay Low
*Assistant Examiner* — George Jin
(74) *Attorney, Agent, or Firm* — David H. Read

(57) ABSTRACT

To reduce emissions at higher engine loads and speeds, methanol fuel is port-injected with charge-air into a diesel engine, and diesel fuel is then direct-injected to initiate combustion. The charge-air has a reduced oxygen concentration sufficient to prevent pre-ignition of the methanol prior to injection of the diesel fuel, and to reduce NOx formation. At low engine speeds and loads, the engine may run on diesel fuel alone.

4 Claims, 2 Drawing Sheets

(56) References Cited

U.S. PATENT DOCUMENTS

| | | | |
|---|---|---|---|
| 2009/0248271 A1* | 10/2009 | Kuzuyama et al. | 701/103 |
| 2011/0088654 A1* | 4/2011 | Courtoy et al. | 123/299 |
| 2011/0191010 A1* | 8/2011 | Russ et al. | 701/108 |
| 2012/0116648 A1* | 5/2012 | Russ et al. | 701/102 |

\* cited by examiner

LOW TEMPERATURE DUAL FUEL COMBUSTION UTILIZING DIESEL AND METHANOL FUELS

BACKGROUND OF THE INVENTION

1. Technical Field

The disclosed embodiments are directed generally to internal combustion engines, and, in particular, to diesel engines utilizing an additional fuel for reduced emissions.

2. Description of the Related Art

A spark-ignition engine introduces the fuel with the intake charge air to achieve good combustion at all loads and speeds. These engines can operate with gasoline, alcohol, or other low-cetane, high-octane fuels. However, they are limited to a relatively low compression ratio, e.g. 9 to 1, in order to limit the potential for compression of the mixture to cause pre-ignition of the fuel before the spark fires.

Diesel engines introduce the fuel after the charge air has been compressed, which prevents the possibility of pre-ignition and thereby allows the engine to operate at a higher compression ratio (e.g. 16 to 1 or higher), where greater fuel conversion efficiency can be achieved. Diesel engines utilize high-cetane, low-octane diesel fuels which easily ignite when directly injected into the compressed charge air. However, direct injected fuel often combusts insufficiently to fully oxidize the fuel, causing harmful particulate matter (carbon particles, also known as smoke or soot) to be present in the exhaust. Also, because the higher compression ratio and combustion temperature can encourage nitrogen-oxygen bonding, diesel engines can also produce high levels of harmful nitrogen oxide emissions ($NO_x$).

It has been a long-standing objective in the art to minimize particulate matter and $NO_x$ emissions from diesel engines. In particular, for diesel engines it is important to achieve high efficiency high load and speed engine operating conditions with low exhaust particulate/smoke content while maintaining low $NO_x$ formation.

Particulate formation occurs when the large, carbon-intensive molecules of conventional diesel fuel are unable to fully oxidize due to insufficient local availability of oxygen, or have insufficient time to access the oxygen during the combustion process. This most often occurs at medium and higher loads (where more diesel fuel molecules and their multiple carbon-to-carbon bonds must be oxidized), for example, beginning about 4 bar BMEP (brake mean effective pressure) and beginning to reach unacceptable levels between about 6 to 8 bar BMEP, and at higher engine speeds (where there is less time for diesel fuel molecules to access oxygen). Fuels comprising molecules with lower carbon content would require less local oxygen to completely oxidize. Also, fuels that also include oxygen (e.g., alcohol fuels such as methanol, $CH_3OH$) would require even less local oxygen to result in good oxidation.

Various methods of charge air dilution can help achieve lower $NO_x$ production. For example, it is known that limiting the intake oxygen concentration levels, e.g. to 11-13%, is required for a diesel engine to hit the EPA $NO_x$ target of 0.2 grams per brake horsepower-hour engine-out at higher loads. Certain patents issued to applicant relate to this goal, including U.S. Pat. No. 6,857,263 (Gray Jr. et al., "Low Emission Diesel Combustion System With Low Charge-Air Oxygen Concentration Levels and High Fuel Injection Pressures").

One indicator that complete combustion has been accomplished is the degree to which the carbon content of the fuel molecule has been converted to an oxidized form, specifically carbon monoxide (CO), which is partially oxidized, or carbon dioxide ($CO_2$), which is completely oxidized. Ideally, all the carbon content of the fuel would be completely oxidized as $CO_2$. Further, since CO is a gas under engine exhaust conditions, small quantities of CO in the exhaust are more easily completely oxidized than elemental carbon (i.e. particulate/smoke) or the carbon in high carbon content fuel molecules.

Adding a second, complement fuel to the intake charge could make oxidation more complete. The term "complement" fuel is used herein to indicate a second fuel that is used together with the diesel fuel in combustion, and which is generally not the preferred fuel in the event of single-fuel combustion. The method of diesel engine fumigation, in which a liquid or gaseous fuel is added as a complement fuel to the charge air, is known in the art. Prior art dual fuel engines, for example those using diesel fuel with a complement fuel, generally add relatively low levels of the second fuel (e.g. 30% or less by volume) to diesel, with little or no intake oxygen reduction (i.e. charge dilution). If larger quantities of the second fuel were used, it would result in early combustion initiation and severe engine knock due to the higher compression ratio present in a diesel engine. The invention herein prevents this problem by diluting the charge air so as to reduce the concentration of oxygen to below that which would support initiation of combustion of the second fuel on compression.

OBJECT OF THE INVENTION

It is an object of the invention to provide for reduced smoke/particulate and $NO_x$ emissions from diesel engines, in particular at high load and speed engine operating conditions.

SUMMARY OF THE INVENTION

According to the present invention, a diesel engine is provided with dual fuel capability, in which a first diesel fuel is direct injected and a second complement fuel, preferably methanol, is port injected (or alternatively, direct injected). At lower engine speeds and loads (e.g., below about 4 bar BMEP or lower, but at least below about 6 bar BMEP), the engine can operate on diesel fuel alone, in which case low levels of smoke/particulate and $NO_x$ can be realized, due to excess oxygen and the lower engine speed allowing for increased mixing time for the fuel and air prior to combustion. At high engine speeds and loads (defined as being above 6 bar BMEP for the purposes herein, unless otherwise indicated), the engine operates on diesel fuel and methanol (which is premixed with the charge air), allowing the engine to achieve much higher loads and speeds while maintaining low levels of smoke/particulate and $NO_R$ emissions.

For a given engine speed and load operating point, the diesel fuel quantity injected directly in the combustion chamber is at or below the quantity that begins to produce significant smoke/particulate levels. This quantity and injection timing are calibration choices but generally should be selected to produce low smoke/particulate levels which can be managed by aftertreatment systems (for example, a smoke number of 1.0 or lower) for a given $NO_R$ target level (e.g., 0.2 grams per brake horsepower-hour, the EPA 2010 standard). The remainder of the fuel energy needed to provide the desired load (e.g. a target BMEP, a target torque, etc) is provided by adding sufficient methanol premixed with the charge air. The quantity of methanol used can exceed diesel fuel quantity at high loads.

Low temperature combustion enables low $NO_R$ emissions. High charge air dilution reduces the concentration of oxygen, one of the two reactants in forming $NO_x$. By using the higher compression ratio diesel base engine to allow the diesel fuel injection to auto ignite the fuel and achieve combustion, and the appropriate reduced charge air oxygen levels to avoid auto ignition of the premixed second fuel, the injection of relatively low levels of diesel fuel at very high load (e.g. 5-10% of total fuel) to initiate combustion of both fuels at the optimum time provides high fuel efficiency (diesel or higher), very low $NO_x$ and low smoke levels. Thus, even though methanol is the complement fuel in the engine system, at high loads it can exceed the quantity of diesel fuel used. This new method of operating a dual fuel engine allows achievement of EPA's very low $NO_x$ standards at high efficiency and low smoke levels, without the need for $NO_x$ aftertreatment.

Another particular advantage of using methanol as the complement fuel is that methanol fuel contains less energy per unit weight or volume than diesel fuel, and methanol has a higher heat of vaporization than diesel fuel. These characteristics result in more of the heat of compression of the charge air being used to vaporize and heat the methanol than diesel fuel alone. The resulting cooler final compression temperature of the charge air requires less charge air dilution to supply the heat capacity to constrain the peak combustion temperature for a given load. The net result is that a target $NO_x$ level (based on peak combustion temperature) can be achieved with less charge air dilution (i.e. higher intake oxygen levels), which requires less boost for the engine for a given engine load, as discussed earlier.

The invention also has the advantage of facilitating the introduction of methanol to the existing fuel distribution infrastructure. For example, the use of methanol as a complement fuel encourages an initial retail market to form for methanol acting in this role, which could later lead to its use as a standalone alternative fuel. This is a more viable path to eventual acceptance of methanol as a standalone alternative fuel because the engine is still capable of operating on only diesel fuel when the alternative fuel is not conveniently available. For example, a "limp home" mode could operate on diesel fuel alone at reduced load and speed operating points, allowing the driver an opportunity to locate a supply of the alternative fuel. The invention is especially well suited to larger fleet vehicles which already prefer diesel engines for high efficiency and which are often centrally fueled.

DETAILED DESCRIPTION

Figure 1:
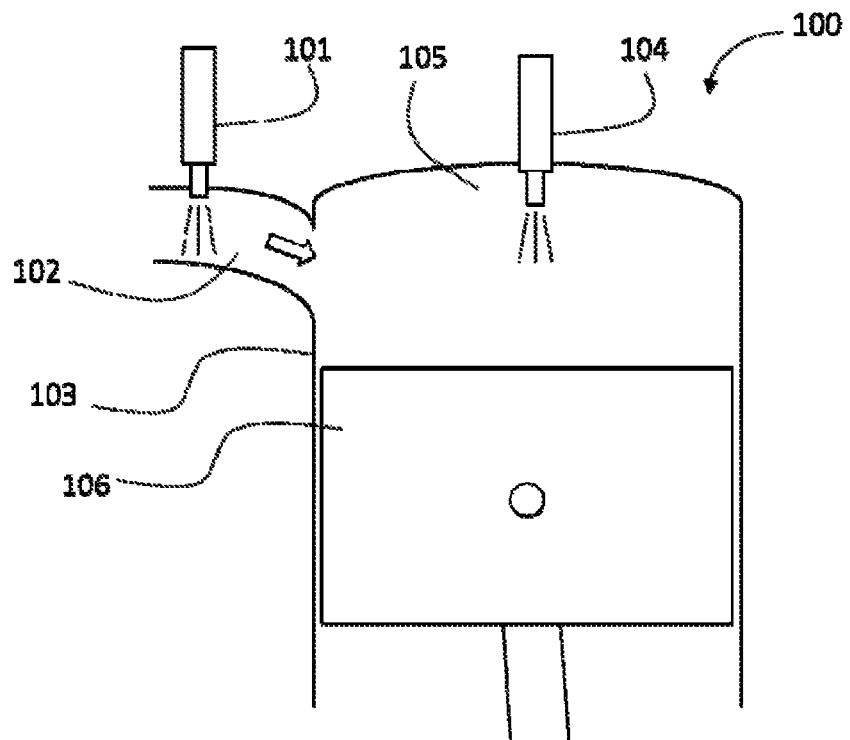
FIG. 1 is an illustration of a dual fuel engine cylinder and intake manifold, showing a direct injector for the diesel fuel and a port injector for the complement methanol fuel.

Referring now to FIG. 1, a portion of a compression ignition engine 100 includes port injector 101, intake manifold 102, engine cylinder 103, direct injector 104, combustion chamber 105, and piston 106. Other components not essential to an understanding of the invention are omitted. The engine may include a single cylinder 103 or a plurality of cylinders each configured as shown.

Port injector 101 is situated with an outlet into intake manifold 102. Port injector 101 is provided to inject the complement fuel (methanol) into the charge air as it enters the engine cylinder 103. Direct injector 104 is situated with an outlet into combustion chamber 105 (which includes part of the upper portion of engine cylinder 103 not swept by piston 106). Direct injector 104 is provided to inject diesel fuel into combustion chamber 105 when ignition is desired.

In operation, piston 106 reciprocates in cylinder 103 according to the well known four-stroke cycle. During the intake stroke, charge air is drawn rapidly from outside the engine into intake manifold 102 and cylinder 103. Now according to the invention, as the charge air is drawn into cylinder 103 it is injected with a charge of complement methanol fuel by means of port injector 101. The charge air has a reduced oxygen concentration (as described below). During the compression stroke, piston 106 compresses this air-fuel mixture. At a point at or near the top of the compression stroke (or, near the beginning of the subsequent expansion stroke), direct injector 104 injects diesel fuel into the combustion chamber 105 which contains the compressed (and therefore heated) air-fuel mixture. Injection of the diesel fuel into the heated mixture initiates combustion of the diesel fuel and the complement fuel, releasing energy for the expansion stroke.

The oxygen concentration of the intake charge air is reduced to a degree necessary (e.g., to below about 14% or 15%) to prevent auto-ignition of the complement fuel-air mixture during the compression stroke and to reduce NOx formation. Oxygen concentration may be controlled by exhaust gas recirculation, as described in commonly-assigned U.S. Pat. No. 6,857,263. As the complement fuel is injected into the intake stream, a certain amount of cooling occurs as the complement fuel is vaporized. The preferred complement fuel, methanol, has a large heat of vaporization, and, compared to other potential complement fuels, a greater cooling effect occurs. This reduces the peak combustion temperature, thereby reducing the formation of $NO_x$ compared to combustion of diesel fuel alone under similar conditions.

It should also be noted that the presence of oxygen in the molecular structure of the methanol ($CH_3OH$) also facilitates complete oxidation of the diesel fuel molecules, reducing the level of particulate/smoke.

The quantity of complement fuel to inject for a given stroke is determined by the amount of energy needed to satisfy an engine torque or load requirement. That is, the quantity of complement fuel is indicated by the total amount of energy desired to be extracted from the stroke (by the combustion of both fuels) minus the amount of energy provided by the diesel fuel alone.

At low loads and speeds, the quantity of diesel fuel injected is determined by considering the maximum quantity that may be combusted alone under these conditions without exceeding NOx and smoke targets. At high loads and speeds, the quantity of diesel fuel remains at or below this quantity, while the additional energy needed to meet the load is extracted from an appropriate quantity of the complement methanol fuel. The quantity of diesel fuel may be varied constantly according to this regimen, or alternatively kept at or near a designated minimum or maximum flow rate.

Figure 2:
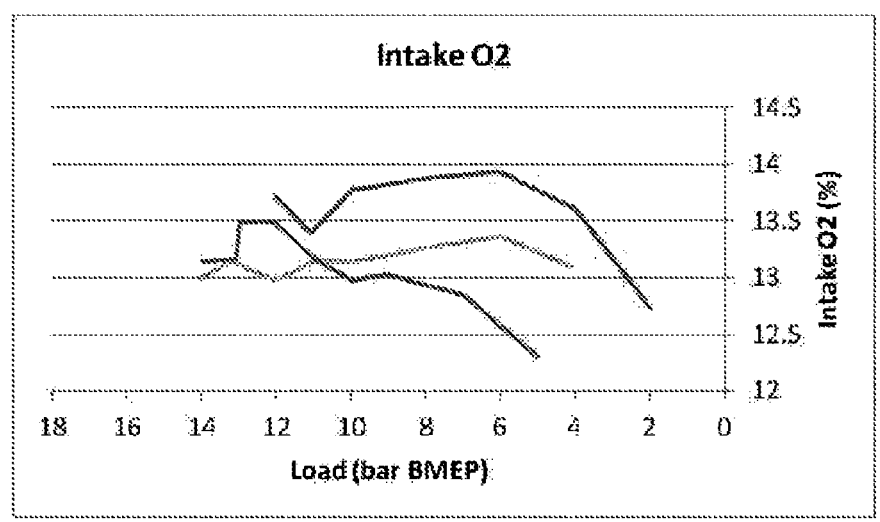
FIG. 2 is a chart showing the intake oxygen level required to achieve a target $NO_x$ level of 0.2 grams per brake horsepower-hour.

FIG. 2 shows the intake oxygen required to achieve a target $NO_x$ level of 0.2 grams per brake horsepower-hour for three different levels of methanol content in the diesel/methanol dual fuel combustion. The higher intake oxygen allowed corresponds to progressively higher methanol content in the dual fuel.

Figure 3:
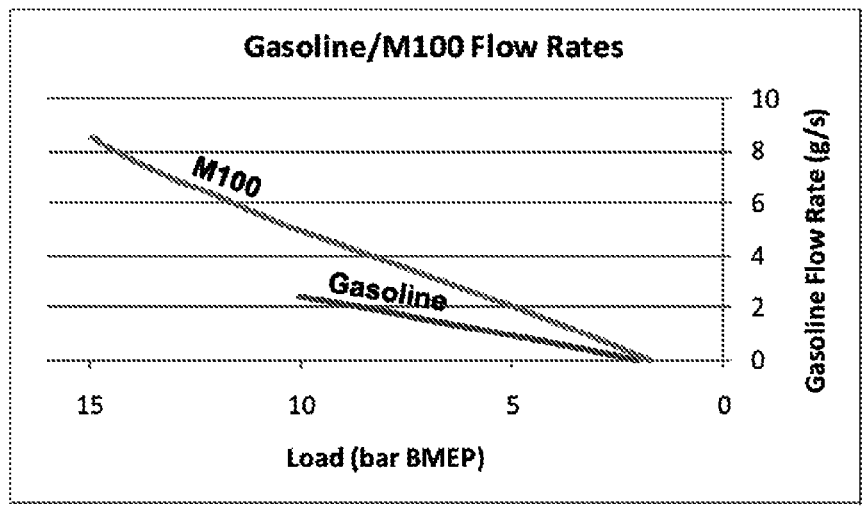
FIG. 3 is a chart showing the flow rates of methanol (compared with gasoline as an alternative complement fuel) for a given total load in which diesel fuel provides a fixed portion of the total load and the complement fuel provides the remainder.
Figure 4:
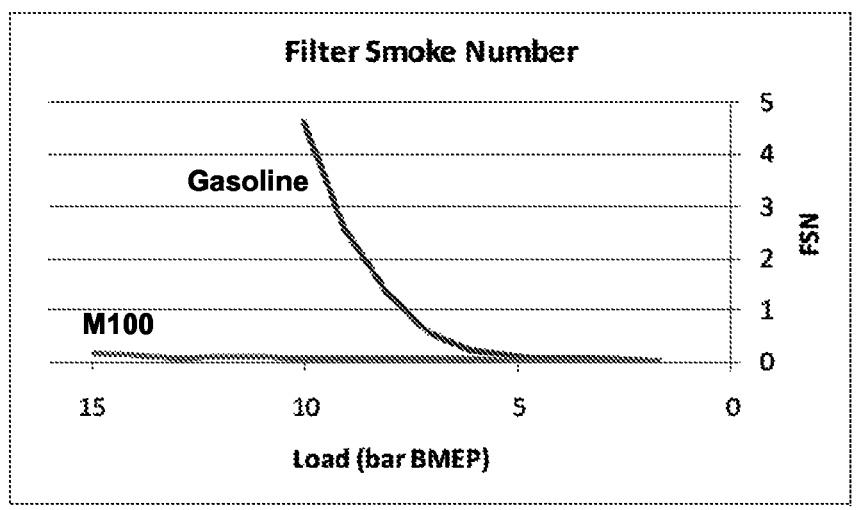
FIG. 4 is a chart showing the particulate emissions (smoke number) associated with the use of each complement fuel for a given load of FIG. 3.

FIGS. 3 and 4 show results for two different complement fuels, gasoline and methanol (respectively) being added to a fixed, base level of directly injected diesel fuel at a flow rate of about 1.3 grams/sec. In FIG. 3, the flow rates for an equivalent energy content of methanol (M100) and gasoline are depicted. It can be seen that the flow rate of methanol is higher than that of gasoline, due to the lower energy content of methanol. In FIG. 4, the filter smoke number for gasoline and methanol is shown. As a reference, operating this engine on diesel fuel alone resulted in smoke levels beginning to rise before a load level of 4 bar BMEP and reaching a smoke level of 4 by about 7.5 bar BMEP. It can be seen that using gasoline as the complement fuel reduces smoke/particulate levels as compared to diesel alone, thus allowing the engine to operate at a higher load level than diesel fuel before smoke levels begin increasing significantly. However, in dramatic contrast, utilizing methanol as the complement fuel results in extremely low smoke levels through a load level of 15 bar BMEP and likely beyond (for this engine, 15 bar BMEP was the peak cylinder load limit).

The improved performance of methanol relative to gasoline in reducing smoke can in part also be explained by the molecular composition of the fuels. Although gasoline has a lower carbon content than diesel fuel, its composition includes a range of molecules of varying carbon content, averaging near eight carbon atoms per molecule, and includes strong carbon-to-carbon bonds and no oxygen atoms. In contrast, methanol has only one carbon atom per molecule, no carbon-to-carbon bonds, and includes one oxygen atom per molecule. For these and other reasons as described above, the results with methanol as the complement fuel are remarkably superior, and methanol is therefore the preferred complement fuel of the invention.

Now being familiar with the invention as described, it will be apparent to those skilled in the art that the quantity of complement fuel injected, the injection timing, the thresholds chosen for the use of methanol versus the use of diesel alone, and the number of injections per cycle may be varied to optimize the emissions or performance of the invention, such variations falling within the scope of the invention. Although the preferred embodiment utilizes port injection of the complement methanol fuel to facilitate mixing with intake air, direct injection of the complement fuel prior to the injection of the diesel fuel is also an alternative.

The invention claimed is:

1. A method of operating a dual fuel engine, utilizing diesel fuel as a combustion-initiating fuel, and methanol as a complement fuel, at high engine loads with low emissions, comprising:
   supplying the combustion chamber with a mixture of methanol and charge air at least at high engine loads, wherein the charge-air has an oxygen concentration below 15% to help event initiation of combustion before direct cylinder injection of the diesel fuel; and
   direct injecting a quantity of diesel fuel into a combustion chamber of the engine to initiate combustion at a desired time near the end of the compression stroke or the beginning of the expansion stroke, wherein the quantity of methanol supplied to the combustion chamber exceeds the quantity of diesel fuel injected into the combustion chamber for engine loads of 8 bar BMEP or higher.

2. The method of claim 1, wherein the quantity of methanol supplied to the combustion chamber exceeds the quantity of diesel fuel injected into the combustion chamber for engine loads of 10 bar BMEP or higher.

3. The method of claim 1, wherein the quantity of methanol supplied to the combustion chamber exceeds the quantity of diesel fuel injected into the combustion chamber for engine loads of 12 bar BMEP or higher.

4. The method of claim 2, wherein the quantity of diesel fuel injected comprises less than 10% of the total fuel supplied to the combustion chamber for engine loads of 12 bar BMEP or higher.

* * * * *